United States Patent [19]

Dorrer et al.

[11] Patent Number: 4,576,994

[45] Date of Patent: Mar. 18, 1986

[54] PROCESS FOR THE PREPARATION OF A POLYPROPYLENE MOLDING COMPOSITION

[75] Inventors: Bernhard Dorrer; Helmut Strametz, both of Frankfurt am Main, Fed. Rep. of Germany

[73] Assignee: Hoechst Aktiengesellschaft, Fed. Rep. of Germany

[21] Appl. No.: 646,583

[22] Filed: Aug. 31, 1984

[30] Foreign Application Priority Data

Sep. 3, 1983 [DE] Fed. Rep. of Germany ....... 3331877

[51] Int. Cl.$^4$ ............................................ C08F 297/08
[52] U.S. Cl. .................................... 525/247; 525/268; 525/270; 525/323
[58] Field of Search ................................ 525/247, 323

[56] References Cited

U.S. PATENT DOCUMENTS 4,128,606 12/1978 Furutachi et al. ................... 525/247
4,308,357 12/1981 Kaus et al. ............................ 525/323

FOREIGN PATENT DOCUMENTS 2094319 9/1982 United Kingdom ................ 525/323

*Primary Examiner*—Wilbert J. Briggs, Sr.
*Attorney, Agent, or Firm*—Connolly & Hutz

[57] ABSTRACT

A polypropylene molding composition with a good hardness and good impact strength at low temperatures is formed by two-stage polymerization of propylene and ethylene in liquid propylene in the presence of a special supported catalyst.

2 Claims, No Drawings

PROCESS FOR THE PREPARATION OF A POLYPROPYLENE MOLDING COMPOSITION

The invention relates to a simplified, inexpensive process for the preparation of a thermoplastic molding composition of a propylene block copolymer with a balanced relationship between hardness and impact strength over a wide temperature range and with low residual catalyst contents in liquid propylene using highly active and highly stereospecific catalysts based on magnesium halide.

Isotactic polypropylene can be processed to shaped articles which have advantageous mechanical properties, in particular good hardness, rigidity and dimensional stability even at higher temperatures. For many applications, the good resistance to stress cracking also has a favorable effect. In contrast, the high glass transition temperature of the polypropylene, which is above 0° C., is a disadvantage. It causes a marked drop in the impact strength, tensile strength and flexural strength of objects produced from isotactic polypropylene as the temperature falls. Attempts have been made to overcome this disadvantage by addition of components with the lowest possible glass transition point, ethylene/propylene copolymers or polyethylene and combinations thereof chiefly being added to the polypropylene. Such mixtures can be prepared by bringing together the individual constituents in roll mills, kneaders or extruders. However, they are also formed by various methods of block copolymerization with Ziegler-Natta catalysts. These block copolymerization processes are particularly advantageous, because the polymer mixture is obtained with improved impact strength and toughness in powder form and, under certain circumstances, granulation before further processing can be avoided.

The block copolymerization reactions are usually carried out by first preparing a pure isotactic, crystalline polypropylene or a predominantly crystalline propylene copolymer containing very little comonomer in the presence of the catalyst and then, in a further step, carrying out the copolymerization for the preparation of an amorphous ethylene/propylene copolymer. Instead of an amorphous ethylene/propylene copolymer, a pure polyethylene is sometimes produced, or the process stage for the preparation of the amorphous ethylene/propylene copolymer is followed by other stages in which ethylene/propylene copolymers of a different composition or pure polyethylene are produced.

The known Ziegler-Natta catalysts which can convert polypropylene into substantially isotactic, crystalline polypropylene in a high yield are used for the preparation of the block copolymers. In most cases, these catalysts consist of a combination of a reduced titanium compound with an organoaluminum compound as a co-catalyst. Recently, however, compounds or combinations of magnesium halide, titanium compound and other compounds with electron donor character have recently been preferred. A mixture of organpaluminum compound and electron donor is then used as the co-catalyst. These catalyst systems display substantial advantages in respect of their activity. They can also be used for the preparation of high impact block copolymers.

The preparation—which is predominantly discontinuous —of block copolymers in liquid propylene using a special catalyst system has already been described (c.f. Japanese Application No. Sho-54-39487). However, the catalyst yields achieved are not sufficient to be able to achieve adequately low residual catalyst contents in the product. The stability, color and odor of the polymer are thereby impaired; in addition, the high chlorine content requires addition of a large amount of acid-binding additives in order to prevent corrosion in processing machines. A polymerization process in which a continuous procedure in the first stage is combined with a batchwise procedure in the stage of preparation of the amorphous ethylene/propylene copolymer is furthermore known (c.f. German Offenlegungsschrift No. 3,208,010), the catalyst being intermediately deactivated by addition of electron donor compounds. However, in the subsequent polymerization stages, the activity of the catalyst must be increased again to the original level by feeding in large amounts of activator. During filling and emptying of the reaction vessels of the second stage, greatly varying polymerization conditions arise, which can be controlled on an industrial scale only with difficulty, especially in the case of highly active catalysts. Thus, in spite of intermediate deactivation of the catalyst, the progress of undesirable reactions cannot be completely avoided, since the catalyst may only form ah intermediate complex with the deactivating agent in the sense of a reversible equilibrium reaction; however, at economically acceptable concentrations of the deactivating agent, some of the catalyst thus still remains active.

Finally, a process has been described which is distinguished, inter alia, by low ethylene concentrations in the preparation of the ethylene/propylene copolymer in the second stage (c.f. German Offenlegungsschrift No. 3,140,664). However, these polymerization reactions with low ethylene concentrations lead to products with very low impact strength at low temperatures. In addition, under the required process conditions, products with a high content of ethylene/propylene copolymer are formed, and these are difficult to work up because of the tackiness of the copolymer. Such polymers have extremely low hardness values and their toughness is almost completely non-existent at low temperatures, which means that their uses are considerably limited.

It has now been found that propylene block copolymers can be prepared in a process which uses highly active and highly stereospecific catalysts, is substantially simplified in comparison with the known processes, avoids their disadvantages and at the same time gives products which have a balanced and sufficiently high hardness and impact strength over the entire temperature range from room temperature to low temperatures, as well as the desired low contents of residual catalyst.

The invention relates to a process for the preparation of a polypropylene molding composition consisting of 65 to 95% by weight of a polypropylene and 35 to 5% by weight of an ethylene/propylene copolymer by continuous polymerization in two stages in liquid propylene, which comprises preparing a crystalline polypropylene or a polypropylene modified by small amounts of another 1olefin in the first stage at a residence time of 30 to 180 minutes and preparing an ethylene/propylene copolymer in the second stage at a residence time of 10 to 90 minutes in the presence of 6 to 60 mole % of ethylene, based on the ethylene/propylene mixture present, a mixed catalyst which has been formed by bringing into contact (A) the reaction product of (a1) a reaction product of a magnesium halide with an electron donor and/or a cyclopolyene and (a21) a compound formed by reduction of titanium tetrachloride by means of an organometallic compound of main groups I to III of the periodic table or (a22) titanium tetrachloride with (B) a halogen-free organoaluminum compound and (C) a compound from the group comprising cyclopolyenes and aromatic carboxylic acid esters, being used in both stages.

A magnesium halide, such as magnesium chloride or magnesium bromide, preferably magnesium chloride, is used for the preparation of component A.

The reaction product a1 of the magnesium halide with the electron donor and/or the cyclopolyene is prepared in a manner which is known per se in the presence or absence of an inert solvent at a temperature of −20° C. to 100° C., for example by heating the magnesium halide in a solution of the reaction partner, suspending the Mg halide in the liquid reaction partner or grinding the two components together. The reaction is preferably carried out in the absence of a solvent, for example by grinding the magnesium halide with the pure electron donor compound and/or the cyclopolyene. Grinding is thereby preferably carried out in a vibratory mill. The grinding time is 1–120 hours or even longer, preferably 30 to 100 hours. However, other comminution methods in which sufficiently shearing forces are exerted on the material to be ground can also be used.

The molar ratio of magnesium halide used to electron donor compound and/or cyclopolyene is greater than 2:1. A molar ratio of 3 to 15:1 is preferred, and a molar ratio of 4.5 to 8:1 is particularly preferred.

Ethers, amides, amines, esters, ketones or nitriles are used as the electron donor compounds. However, the electron donor compounds used should contain no hydrogen bonded to oxygen or nitrogen.

Examples of suitable electron donor compounds are esters of aromatic carboxylic acids, cyclopolyenes, diethyl ether, dioxane, anisole, dimethylacetamide, tetramethylethylenediamine, ethyl acetate, acetone, acetophenone, acetonitrile and benzonitrile.

Esters of aromatic carboxylic acids, such as ethyl benzoate, methyl benzoate, ethyl p-toluylate, methyl p-toluylate, ethyl anisate and methyl anisate, or cyclopolyenes, such as, for example, cyclohepta-1,3,5-triene and cyclooctatetraene are preferably used as the electron donor compounds.

The reaction product a21 prepared by reduction of titanium tetrachloride with an organometallic compound of elements of main groups I to III of the periodic table is not pure titanium trichloride but contains organometallic compounds bonded in an unknown manner.

An organoaluminum compound of the formula $AlR_{3-n}X_n$, in which R denotes an alkyl radical with 1–6 carbon atoms, X denotes R or halogen and n is 0 to 2, is preferably used as the reducing agent. Examples of such compounds are diethyl-, dipropyl-, diisopropyl- and diisobutyl-aluminum chloride, preferably diethyl-aluminum chloride, or alkyl-aluminum sesquichlorides, which are equimolecular mixtures of dialkyl-aluminum chloride and alkyl-aluminum dichloride, preferably ethyl-aluminum sesquichloride, or trialkyl-aluminums, such as trimethyl-, triethyl-, tripropyl-, triisobutyl- or tridiisobutylaluminum, preferably triethyl-aluminum and triisobutylaluminum, and also the reaction products of trialkylaluminums or dialkyl-aluminum hydrides which contain alkyl radicals with 1–6 carbon atoms with dienes containing 4–8 carbon atoms. An example of the latter compounds is the reaction product of aluminum-triisobutyl or diisobutyl-aluminum hydride with isoprene, which is commercially available under the name Aluminumisoprenyl.

The reduction is carried out in an inert saturated liquid aliphatic hydrocarbon, such as butane, pentane, hexane, octane or cyclohexane, or a hydrocarbon mixture, such as, for example, a benzine fraction with a boiling range from 130° to 160° C., or in a liquid aromatic hydrocarbon, such as benzene, toluene or the xylenes. Hexane, the abovementioned benzine fraction or toluene is preferably used.

The reaction of titanium tetrachloride with the organoaluminum compound can be carried out by adding the titanium tetrachloride, if appropriate dissolved in an inert hydrocarbon, to a solution of the organoaluminum compound, or vice versa. However, it is also possible to introduce both components into an inert reaction medium at the same time. Preferably, the organoaluminum compound is added to the titanium tetrachloride.

The molar ratio of titanium tetrachloride to organoaluminum compound in the reduction can be varied within a range from 1:0.2 to 1:1.5, and a molar ratio of 1:0.33 to 1:1.1 is preferably used.

The reduction of $TiCl_4$ by the organoaluminum compound can also be carried out in the presence of an ether; preferably, the ether is mixed with the titanium tetrachloride and the organoaluminum compound is then added. Ethers of the formula $R^1$—O—$R^2$, in which $R^1$ and $R^2$ can be identical or different and denote an alkyl radical with 2–18 carbon atoms, are used. Examples are diethyl ether, di-n-propyl ether, di-n-butyl ether, ethyl n-butyl ether, di-isoamyl ether, dioctyl ether and di-dodecyl ether, and di-n-butyl ether and di-isoamly ether are preferably employed. The molar ratio of titanium tetrachloride to ether is 1:0.3 to 1:1.5, preferably 1:0.9 to 1:1.1.

The reduction of the titanium tetrachloride with the organoaluminum compound is carried out at a temperature of −50° C. to +80° C., preferably at −20° C. to +25° C.

To bring the reduction to completion, the reaction product can be subjected to heat treatment at a temperature of 40° to 150° C.; the heat treatment can be carried out in one stage or also in 2 stages, for example at 60° C. to 95° C. in the first stage and at a temperature above 100° C. in the 2nd stage.

Soluble and insoluble reaction products are formed in the reaction medium in the reaction of titanium tetrachloride with the organoaluminum compound, if appropriate in the presence of ethers. The insoluble reaction product can be isolated and can be freed from the soluble reaction products by washing with the solvent used for the reduction.

The reaction product a1 of magnesium dihalide-electron donor and/or -cyclopolyene is then brought into contact with the reaction product a21 of titanium tetrachloride with an organometallic compound or the titanium tetrachloride a22. Component a21 can be employed here either as the pure solid separated off from the reaction medium or together with the other reaction products from the reduction reaction. However, it is also possible to use only the soluble reaction products.

The components are preferably brought into contact in an inert hydrocarbon medium, it being advantageous to take the reaction product a21 of titanium tetrachloride and the organometallic compound or the titanium tetrachloride and to add the reaction product a1 as a suspension in an inert hydrocarbon. It is also possible to bring the reaction partners together at the same time. It is particularly preferable to add the titaniumcontaining component. The components are brought into contact in the temperature range from $-50°$ C. to $150°$ C., preferably $20°$ C. to $100°$ C.

In the case of the reduced transition metal compound a21, the amount of reactants a1 and a21 used is of decisive importance for the activity of the catalysts and the ash and halogen content of the polymers. The amount of titanium trichloride used should be greater than 30% by weight, preferably 40 to 200% by weight and in particular 50 to 140% by weight, based on the reaction product 1a.

In the case of the magnesium halide-electron donor or -cyclopolyene complex a1 reacted with titanium tetrachloride (a22), the Mg/Ti ratio is preferably in the range from 3 to 40:1, particularly advantageously in the range from 10 to 30:1. If component A has been prepared by bringing component a1 into contact with titanium tetrachloride, the excess titanium tetrachloride which is not bound is now washed out with one of the hydrocarbons already mentioned.

Components a1 and a21 or a22 can also be brought into contact for the preparation of the titanium chloride-containing mixed catalyst component A by dry grinding or grinding in a hydrocarbon.

The components are brought into contact over a period of 10 minutes to 600 minutes, preferably 60 to 300 minutes.

A catalyst component A which has been formed from components a1 and a21 is preferably used.

Suitable halogen-free organoaluminum compounds (component B) are, in particular, branched, unsubstituted aluminum-alkyls of the formula $AlR^3$, in which $R^3$ denotes an alkyl radical with 1–10 carbon atoms, such as, for example, aluminum-trimethyl, aluminum-triethyl, aluminum-triisobutyl and aluminum-tridiisobutyl. The reaction products of aluminum-triisobutyl or diisobutyl-aluminum hydride and isoprene, which are commercially available under the name Aluminumisoprenyl, are also suitable. Aluminum-triethyl and aluminum-triisobutyl are particularly suitable.

The mixed catalyst component C consists of a stereoregulator which is selected from the group comprising cyclopolyenes and/or aromatic carboxylic acid esters. Cyclopolyenes which are to be mentioned in particular are cyclohepta-1,3,5-triene and cyclooctatetraene, and carboxylic acid esters which are preferably used are methyl benzoate, ethyl benzoate, ethyl p-toluylate, methyl p-toluylate, ethyl anisate and methyl anisate. The compounds can be used by themselves or as mixtures, for example of cyclohepta-1,3,5-triene and aromatic carboxylic acid esters.

The amount of catalyst component C depends on the amount of catalyst component B. The molar ratio of component B to component C should be greater than 1:1, and should preferably be 1.5:1 to 15:1.

The catalyst concentration in the liquid propylene is chosen in the usual way for homopolymerization of propylene. The concentration of component A is thus 0.001 to 1 mole/liter, based on the titanium, preferably 0.01 to 0.1 mole/liter. Component B is used in a concentration of 0.01 to 40 moles/liter, preferably 0.1 to 4 moles/liter, and component C is employed in a concentration of 0.003 to 12 moles/liter, preferably 0.03 to 1.2 moles/liter.

The process according to the invention is carried out in two stages, a highly crystalline polypropylene or polypropylene modified with a small amount of another 1olefin as a comonomer being prepared in the first stage and an ethylene/propylene copolymer being prepared in the second stage.

The polymerization in the first reaction stage is carried out by pumping liquid propylene, a suspension of the solid catalyst component in an inert suspending agent and the other liquid catalyst constituents continuously into a suitable reaction vessel. This reaction vessel can be an autoclave, a conventional reaction kettle or a tube reactor in loop form, adequate thorough mixing being ensured in the customary manner by built-in stirrers or circulating pumps. Instead of a single reaction vessel, it is also possible to use two or more reaction vessels connected to one another by pipelines. The starting products are then fed into the first vessel. The heat of reaction is removed by jacket cooling, by internal coolers built into the vessels or by evaporative cooling.

The liquid propylene itself, which serves both as the monomer and as the suspending agent, can contain varying amounts of inert, low-boiling, dissolved constituents, such as, for example, propane or nitrogen, which, however, have no influence on the products formed in this process.

A reaction temperature of $40°$ to $85°$ C., preferably $50°$ to $75°$ C., is maintained in the first reaction stage.

The desired molecular weight of the block copolymer is obtained by addition of hydrogen to the liquid propylene. The amount added is adjusted so that the product formed in the first reaction stage has a melt flow index MFI 230/5 of 0.05 to 100 dg/minute.

The amount of polymer prepared in the first stage is 65 to 95% by weight, preferably 70 to 90% by weight and in particular 75 to 85% by weight, based on the entire solid polymer formed in the process.

If a polypropylene modified with small amounts of another 1-olefin as a comonomer is to be prepared in the first stage, the comonomer is continuously metered in in the same way as the other starting substances. Possible other 1-olefins are monounsaturated hydrocarbons with 2 to 10 carbon atoms, preferably ethylene and butene, in particular ethylene. It is also possible to use mixtures of the said 1-olefins. The concentrations are 0 to 1 mole %, based on the liquid propylene fed in. If ethylene is used, the ethylene content of the liquid propylene can also be established by recycling a part amount of the ethylene/propylene mixture obtained when the process has been carried out.

The polymer suspension which is formed in the first stage and which essentially contains the predominantly crystalline, isotactic polypropylene, which may be modified with small amounts of a 1-olefin, the active catalyst constituents, liquid propylene, small amounts of hydrogen and, if appropriate, inert constituents, is now transferred to the second reaction stage, the two stages being directly connected to one another. Specifically, the direct connection between the first and second stage can be effected, for example, by connecting the reaction vessels in question to one another by an open pipeline through which the suspension flows in a continuous stream into the second stage. In this case, it is necessary for a slightly higher pressure to prevail in the first stage than in the second stage, which can be effected, for example, by forcing in a covering layer of an inert gas into the reaction vessel (or the reaction vessels) of the first stage. However, it is also possible to keep the reaction vessels of the first stage full of liquid and to produce the required gauge pressure by forcing the liquid propylene into the first stage via an appropriately designed pressure pump. If the amounts of suspension which must be transferred from the first to the second stage are very small, as is generally the case on an experimental scale, it may become necessary for a valve which is opened and closed at regular intervals of time via a suitable control to be incorporated into the pipeline in question. The intervals of time are chosen so that the pauses in which the valve is closed are in the region of seconds or a few minutes. The periods over which the valve is opened are generally shorter than those over which it is closed. In this manner, small amounts of suspension can flow over without blockages or back-mixing occurring and without the continuous characteristics of the preparation process being destroyed, since the cycle times of the valve control are very small in comparison with the average residence time in the reaction vessels.

The suspension can, however, also be conveyed from the first to the second stage via a pump. In this case, the pressure in the first stage does not absolutely have to be above that in the second stage.

As regards the vessels used and their size, the reaction space in the second stage is essentially similar to that in the first stage. In particular, similar types of reaction vessels, and if appropriate several of them, are used. In this manner, the reaction volume in the second stage can be utilized for the polymerization of normal, isotactic polypropylene at times when no block copolymer is being prepared, which means that a significant increase in the throughput of the polymerization plant is to be achieved.

A sufficiently high concentration of ethylene in the liquid propylene is maintained in the second stage. It is 6 to 60 mole %, preferably 10 to 55 mole % and in particular 15 to 50 mole %, in each case based on the ethylene/propylene mixture. The ethylene concentration is established by feeding ethylene into the reaction vessel or the reaction vessels of the second stage. However, it is also possible to feed in an ethylene/propylene mixture such as is obtained after the process has been carried out and the other starting substances and reaction products have been removed.

The temperatures in the second polymerization stage are 40° to 85° C., preferably 50° to 70° C. and in particular 60° C.

The pressure in the second stage is 23 to 64 bar, preferably 31 to 50 bar.

The residence times in the individual reaction stages are adjusted so that they are 30 to 180 minutes, preferably 40 to 90 minutes, in the first stage and 10 to 90 minutes, preferably 15 to 70 minutes, in the second stage.

It is also possible additionally to pass an activator and, if appropriate, a stereo-regulator into the second stage. This is advantageous, in particular, of the polymerization in the first stage is carried out at a low molar ratio of activator to titanium compound or at a low activator concentration.

If necessary, additional hydrogen is also fed into the second stage for suitable regulation of the molecular weight of the polymer prepared in that stage.

Immediately after the polymerization has been carried out in the second stage, the polymer formed is removed from the suspending agent and the other soluble reaction products. This can be effected by a filtration, decantation or centrifugation step in pressure-resistant units suitable for this purpose, for example in pressure filters, sedimentation towers, centrifuges or decanters. The separation can be preceded by a washing operation in which the suspension is subjected, for example, to counter-current washing with fresh liquid propylene, in order to bring the removal of the soluble reaction products to completion. The washing and separation can also be carried out in a single unit which fulfils both aims, such as, for example, in a washing and sedimentation tower by the counter-current principle. A highly thickened suspension of the polymer powder in substantially pure suspending agent is then removed at the bottom end of the tower.

As a result of the very high activity of the catalyst used according to the invention and the design of the process, it is generally not necessary to provide for removal of the catalyst residues. However, if an exceptionally low content of residual catalyst should be desired, a vessel can be inserted between the second polymerization stage and the separation, in which improved separation of the catalyst residues can be effected at a temperature of 50° to 80° C., preferably 60° to 70° C., by addition of hydrogan-anid compounds which decompose the organoaluminum compounds and at the same time have a complexing effect on the magnesium halide contained in the polymer powder. Examples of suitable compounds of this type are higher aliphatic carboxylic acids, such as 2-ethylhexanoic acid.

The propylene-moist polymer powder obtained after removal of the liquid constituents is now dried completely.

The process according to the invention, which is carried out continuously, allows the preparation, by the use of liquid propylene as the suspending agent and the simultaneous use of the catalysts according to the invention, of block copolymers in a high yield and with high isotacticity, which means, on the one hand, manifold savings in apparatus and process steps and, on the other hand, low contents of residual catalyst, low contents of amorphous atactic polypropylene in the product and a smaller amount of wax-like by-products. The reaction conditions in the second stage are controlled so that high-grade ethylene/propylene copolymers which impart to the block copolymers the advantageous impact strength properties mentioned are formed.

The block copolymer prepared by the process according to the invention has a balanced relationship between hardness and impact strength over a wide temperature range from room temperature to $-40°$ C. and has low contents of residual catalyst.

The block copolymer furthermore has a melt flow index MFI 230/5 of 0.05 to 100 dg/minute and contains 1 to 40% by weight, preferably 4 to 35% by weight and in particular 7 to 24% by weight, of ethylene. Its hardness is in general between 30 and 80 $N/mm^2$, preferably between 40 and 70 $N/mm^2$, and its notched impact strength is generally greater than 10 and preferably greater than 25 $mJ/mm^2$ at 23° C., generally greater than 5 and preferably greater than 15 $mJ/mm^2$ at 0° C., and generally greater than 3 and preferably greater than 5 $mJ/mm^2$ at $-40°$ C.

The block copolymer obtained according to the invention is provided with the customary additives (stabilizers, lubricants, fillers, pigments and the like) for further processing. It can be either converted into granular form in extruders or kneaders or, on the basis of its ease of homogenization, used directly in powder form, without prior treatment in an extruder or kneader, for the production of articles made of plastic. Since its melt viscosity can be varied over the entire range required for the known processing methods, it can be processed by all of these methods. The articles thereby produced have a good hardness, rigidity and elasticity and a high impact strength and resistance to white fracture down to temperatures of −40° C., and are distinguished by a good appearance, since virtually no hard spots, streaks or flow marks occur.

The properties of the polymers prepared according to the Examples below were determined, in detail, by the following methods:

The melt flow index MFI 230/5 was measured in accordance with DIN 53 735 and has been given in dg/minute.

The ball indentation hardnesses were measured in accordance with DIN 53 456 on pressed sheets which had been heated at 140° C. under $N_2$ for 3 hours, cooled in the course of 3 hours and stored in a climatically controlled chamber at 23° C. and 50% relative atmospheric humidity for balancing of the temperature.

For determination of the mechanical properties at room temperature and low temperatures, the notched impact strength was measured at 23° C., 0° C. and −40° C. on small standard bars with a V-notch in an approximation of the method of DIN 53 453. The test pieces were taken from pressed sheets which had been stored at 23° C. and 50% relative atmospheric humidity for 24 hours after production.

The ethylene content was determined on films 100 μm thick and pressed at 180° C., the absorption bands at wavelengths of 13.65 and 13.9 μm being used for the evaluation.

The content of titanium and chlorine was determined by X-ray spectrometry, and that of magnesium was determined by atomic absorption spectroscopy.

EXAMPLE 1

1. Preparation of the solid catalyst component 1.1. 702 g (=7.37 moles) of anhydrous magnesium chloride and 170.4 g (=1.13 moles) of ethyl benzoate were ground under nitrogen in a vibratory mill for 100 hours. The steel vessel used had a capacity of 5 liters and contained 15 kg of stainless steel balls 15 mm in diameter.

1.2. 0.25 kg of titanium tetrachloride in 2.2 liters of toluene was reacted first with 0.17 kg of di-n-butyl ether and then with a solution of 76 g of triethyl-aluminum in 0.4 liter of toluene, in each case at 25° C. in the course of 15 minutes, in a 10 liter stirred vessel in the absence of air and moisture. The batch was then allowed to after-react at the same temperature for 5 hours.

1.3. 660 g of the ground material prepared according to 1.1 were suspended in 30 liters of a hydrogenated, oxygen-free benzine fraction (boiling point 140°-165° C.) in a 60 liter stirred vessel and the suspension was heated to 80° C. The solution of the titanium compound prepared according to 1.2 was metered in over a period of 30 minutes, after which the reaction mixture was kept at 80° C. for a further 2 hours. After the mixture had been cooled to room temperature, the solid was removed on a pressure filter, in the absence of air, and washed three times with in each case 15 liters of the benzine fraction. It was then suspended in 20 liters of the benzine fraction. The titanium content of the suspension was determined colorimetrically. 50 ml portions of the suspension were removed at intervals of 3 hours, diluted to 40 liters and prepared for the polymerization. The concentration was then 0.05 mmol/liter, based on the titanium.

2. Polymerization:

The polymerization was carried out continuously in two stirred kettles, connected in series, with impeller stirrers, a capacity of 40 liters each and a pressure resistance of 64 bar nominal pressure.

The connecting line between the two kettles contained a valve which was periodically kept closed for 60 seconds and opened for 4 seconds. The second kettle was equipped with a level control which limited the level of fill to 90%. The following quantities were fed into the first kettle at a polymerization temperature of 70° C.: 37.0 liters/hour of liquid propylene warmed to 30° C., 6 N liters/hour of hydrogen, 12 liters/hour of the suspension of the solid catalyst constituent in the benzine fraction, 1.2 liters/hour of triethyl-aluminum, diluted to 50 mmol/liter in the benzine fraction, and 0.38 liter/hour of methyl p-toluylate, dissolved in the benzine fraction likewise in a concentration of 50 mmol/liter. The polymerization in the second kettle was carried out at a temperature of 60° C. 1.5 m³/hour of ethylene of 30° C. were metered in here.

On the basis of these conditions, a pressure of 34.7 bar (gauge pressure) was established in the first kettle and a pressure of 34.5 bar (gauge pressure) was established in the second kettle. It was possible to remove from the second kettle a gas sample in which 23.4% by volume of ethylene was found. This corresponded to an ethylene partial pressure of 8.3 bar absolute, which means that an ethylene concentration in the liquid propylene of about 12 mole % was reached.

The solid product was separated off from the liquid constituents from the product stream from the second kettle and was dried under 2 bar at 50° C. with a residence time of 2 hours. 5.5 kg/hour of powder were thereby to be obtained. The powder had the properties described in the Table.

On evaporation of the mother liquor, which consisted predominantly of propylene and ethylene, 0.2 kg/hour of a wax-like polymer remained. This corresponds to about 3.1% by weight, based on the powder obtained.

EXAMPLE 2

The polymerization was carried out in a similar manner to in Example 1. 40 liters/hour of liquid propylene and the same amounts of catalyst constituents as in Example 1 were fed into the first kettle. The kettle temperature was adjusted to 65° C. The polymerization in the second kettle was carried out at a temperature of 50° C. 1.5 m³/hour of ethylene were fed into this kettle. A pressure of 28.9 bar (gauge pressure) prevailed in the first kettle, and a pressure of 28.6 bar (gauge pressure) prevailed in the second kettle. A gas sample removed from the second kettle contained about 23% by volume of ethylene, from which an ethylene partial pressure of 6.8 bar absolute was to be calculated. This meant that the ethylene concentration in the liquid propylene was about 12 mole %, taking into consideration the different temperature in comparison with Example 1. 4.6 kg/hour of powder and about 90 g/hour of soluble polymer were obtained.

EXAMPLE 3

The polymerization according to Example 1 was repeated, 41 liters/hour of liquid propylene, the same amounts of catalyst constituents as in Example 1 and 1.8 m³/hour of ethylene being passed in. Both reaction vessels were kept at 70° C. 5.7 kg/hour of powder and 200 g/hour of soluble polymer were obtained. The gas sample taken from the second kettle contained 18% by volume of ethylene. With a pressure of 40.2 bar (gauge pressure) in the first kettle and 40.0 bar (gauge pressure) in the second kettle, this meant an ethylene partial pressure of 7.5 bar absolute and a concentraton of ethylene in the liquid propylene of 11 mole %.

EXAMPLE 4

The polymerization according to Example 1 was repeated, but, as a modification of the conditions of Example 1, the second reaction kettle was adjusted to a level of fill of 30%, and 39.0 liters/hour of liquid propylene of 30° C., 6.5 N liters/hour of hydrogen, 15.6 liters/hour of the solid catalyst constituent with a concentration of 0.045 mmol/liter of titanium, 1.4 liters/hour of triethyl-aluminum and 0.44 liter/hour of methyl p-toluylate, in the same concentrations as mentioned in Example 1, were fed into the first kettle. 3.2 m³/hour of ethylene were passed into the second kettle.

A pressure of 42.5 bar (gauge pressure) was built up in the first kettle, and a pressure of 42.2 bar (gauge pressure) was built up in the second kettle. The gas sample from the second kettle contained 36% by volume of ethylene, from which an ethylene partial pressure of 15.6 bar (absolute) was calculated. The concentration of ethylene in the propylene was accordingly about 24 mole %.

7.1 kg/hour of solid product and about 250 g/hour of soluble polymer were isolated.

EXAMPLE 5

The polymerization according to Example 4 was repeated, but as a modification of the conditions, 8.6 m³/hour of ethylene were fed into the second stage. The following pressures were thereby measured: first kettle: 58.5 bar (gauge pressure); second kettle: 58.2 bar (gauge pressure). The gas sample from the second kettle contained about 52% by volume of ethylene, from which a partial pressure of about 31 bar was calculated. Over 40 mole % of ethylene was thus dissolved.

The throughput per hour was 6.5 kg of powder and about 280 g of soluble polymer.

EXAMPLE 6 1. Preparation of the solid catalyst component:

530 g (5.57 moles) of anhydrous magnesium chloride containing less than 1% by weight of water and 280 g (1.86 moles) of ethyl benzoate were ground under nitrogen in a vibratory mill for 100 hours. The steel vessel used had a capacity of 5 liters and contained 15 kg of stainless steel balls 15 mm in diameter. 250 g of the ground product were introduced, under a nitrogen atmosphere, into a 5 liter stirred vessel and were suspended in 3.75 kg of TiCl₄ in this vessel. The suspension was stirred at 80° C. for 2 hours and then filtered at this temperature. The residue was washed at 80° C. five times with in each case 4 liters of the benzine fraction described in Example 1, and was suspended in 4 liters of the benzine fraction. For the polymerization, 50 ml portions were taken at intervals of about 4 hours and diluted to 20 liters. The concentration was then 0.045 mmol/liter, based on the titanium.

2. Polymerization:

The polymerization was carried out as in Example 4. The following were used: 41 liters/hour of liquid propylene, 5.1 liters/hour of the solid catalyst constituent suspension described above, 1.8 liters/hour of triethyl-aluminum and 0.54 liter/hour of methyl p-toluylate, both in a concentration of 50 mmol/liter of the benzine fraction, and 3.5 m³/hour of ethylene. A pressure of 43.1 bar (gauge pressure) was established in the first kettle and a pressure of 42.9 bar (gauge pressure) was established in the second kettle. The gas analysis showed 37% by volume of ethylene in the second kettle, corresponding to a partial pressure of 16.3 bar absolute or a concentration of about 24 mole %. 6.7 kg/hour of solid product and about 230 g/hour of soluble product were obtained.

EXAMPLE 7

The polymerization was carried out in a similar manner to Example 6. However, the following changes were made: Metering of 0.46 liter/hour of triethyl-aluminum and 0.14 liter/hour of methyl p-toluylate into the first kettle. A further 0.23 liter/hour of triethyl-aluminum was fed into the second kettle together with 3.3 m³/hour of ethylene.

The kettle pressures were 41.1 and, respectively, 40.8 bar (gauge pressure), and the gas phase in the second kettle contained 34% by volume of ethylene, which means an ethylene partial pressure of 14.3 bar absolute and a concentration of about 21 mole %. The hourly production was 6.7 kg of solid product and about 280 g of soluble polymer.

EXAMPLE 8

The polymerization according to Example 6 was repeated, the only change being that 14 N liters/hour of hydrogen were introduced into the first kettle. 6.5 kg/hour of solid polymer and 310 g/hour of soluble polymer were obtained.

COMPARISON EXAMPLE A

The polymerization was carried out under the conditions of Example 6However, in accordance with German Offenlegungsschrift No. 3,140,664, a low ethylene concentration in the liquid propylene was established in the second reaction kettle, equivalent to a low ethylene partial pressure. This was effected by gassing in 0.56 m³/hour of ethylene. The following pressures were established: 29.1 bar (gauge pressure) in the first kettle, 28.9 bar (gauge pressure) in the second kettle. A sample of the gas from the second kettle had an ethylene content of 13% by volume. An ethylene partial pressure of approximately 4 bar absolute was calculated from this, which meant a concentration of about 4 mole %. 6.1 kg/hour of powder and 185 g/hour of soluble polymer were obained.

COMPARISON EXAMPLES B AND C

Comparison Examples B and C were carried out under the conditions of Examples 1 and 2 of German Offenlegungsschrift No. 3,140,664 Chunks of a very tacky product were thereby obtained, which could only be isolated by completely taking apart the polymerization autoclave. They had the properties shown in the Table, the extremely low hardness in compartion with Examples 1 to 8 and the almost complete loss of impact strength between 0° C. and −40° C. being particularly striking.

wax-like polymer were obtained. Testing gave the values shown in the Table.

TABLE

| | Melt flow index 230/5 dg/minute | Ethylene content % by weight | Hardness N/mm$^2$ | Notched impact strength at | | | Contents of catalyst residues | | |
|---|---|---|---|---|---|---|---|---|---|
| | | | | 23° C. mJ/mm$^2$ | 0° C. | −40° C. | Ti ppm | Mg ppm | Cl ppm |
| Example 1 | 4.1 | 8.6 | 49 | 43 | 34 | 8 | 5 | 19 | 66 |
| Example 2 | 6.9 | 4.6 | 66 | 17 | 10 | 4 | 5 | 19 | 76 |
| Example 3 | 3.0 | 12.5 | 46 | n.b. | 32 | 8 | 5 | 18 | 64 |
| Example 4 | 4.1 | 12.9 | 58 | 32 | 11 | 5 | 4 | 17 | 60 |
| Example 5 | 3.1 | 19.4 | 48 | 44 | 37 | 10 | 5 | 19 | 66 |
| Example 6 | 4.1 | 13.4 | 55 | 38 | 20 | 9 | 3 | 26 | 81 |
| Example 7 | 2.8 | 15.5 | 40 | 58 | 47 | 18 | 2 | 24 | 83 |
| Example 8 | 52 | 12.4 | 67 | 15 | 9 | 4 | 2 | 27 | 82 |
| Comparison Example A | 7.2 | 2.7 | 61 | 14 | 5 | 2 | 3 | 29 | 89 |
| Comparison Example B | 1.3 | 9.5 | 10 | n.b. | n.b. | 2 | 3 | 30 | 93 |
| Comparison Example C | 1.4 | 11.5 | 7 | n.b. | n.b. | 3 | 2 | 25 | 83 |
| Comparison Example E | 7.0 | 3.5 | 62 | 15 | 7 | 2 | 3 | 50 | 155 | n.b. = no break in the test piece at 60 mJ/mm$^2$

COMPARISON EXAMPLE D

To carry out a batchwise polymerization with the same amount of catalyst as in Example 6, a kettle of 40 liters capacity and with an impeller stirrer and an internal pressure resisance of 64 bar was charged successively with 30 liters of liquid propylene, 46 ml of 2 molar solution of triethyl-aluminum and 13.6 ml of a 2 molar solution of methyl p-toluylate, both dissolved in the benzine fraction, and 12.2 ml of a suspension of the solid catalyst constituent of Example 6 in a concentration of 18.9 mmol/liter, based on the titanium, in the benzine fraction. The contents of the kettle were then heated up at a rate of 3° C./minute. At an internal temperature of about 45° C., the polymerization reaction started. Although the highest possible amount of cooling water was now pumped into the kettle jacket at a temperature of 17° C., the internal temperature rose at a rate of about 15° C./minute and reached a peak temperature of over 90° C. after about 3 minutes. It was possible to establish a constant internal temperature of 70° C. only in the course of a further half an hour, in which the activity of the catalyst decreased.

COMPARISON EXAMPLE E

The polymerization was carried out under similar conditions to those in Example 1, but a catalyst prepared from magnesium chloride, benzoyl chloride, titanium tetrachloride and triphepyl phosphite in toluene according to Embodiment Example 1 of Japanese Application No. Sho 54-39 487 was used. There were the following changes in the amounts fed into the first kettle: 39.0 liters/hour of liquid propylene of 30° C., 8 N liters/hour of hydrogen, 0.29 mmol/hour of the above-mentioned catalyst (based on the titanium contained in the solid), 1.4 liters/hour of triethyl-aluminum in the dilution mentioned and 0.56 liter/hour of ethyl benzoate, also dissolved in the benzine fraction in a concentration of 50 mmol/liter. 0.70 m$^3$/hour of ethylene was metered into the second kettle at an internal temperature of 65° C.

A pressure of 33.3 bar was established in the first kettle and a pressure of 33.1 bar (gauge pressure) was established in the second kettle. An ethylene content of 14.6% by volume was to be determined in a gas sample from the second kettle, corresponding to an ethylene partial pressure of 5.0 bar absolute and a concentration of the dissolved ethylene of 6 mole %.

4.93 kg/hour of powder and about 0.23 kg/hour of

We claim:

1. A process for the preparation of a polypropylene molding composition consisting of 65 to 95% by weight of a polypropylene and 35 to 5% by weight of an ethylene propylene copolymer by continuous polymerization in two stages in liquid propylene, which comprises preparing a crystalline polypropylene or a polypropylene modified by small amounts of another 1-olefin in the first state at a temperature between about 40° C. and about 85° C. and a pressure higher than the pressure of the second stage and a residence time of 40 to 90 minutes and preparing an ethylene/propylene copolymer in the second stage at a temperature between about 40° C. and about 85° C. and under a pressure of 23 to 64 atmospheres and a residence time of 10 to 90 minutes in the presence of 10 to 55 mole % of ethylene, based on the ethylene/propylene mixture present, a mixed catalyst which has been formed by bringing into contact
 (A) the reaction product of
 (a1) a reaction product of a magnesium halide with an electron donor and/or a cyclopolyene and
 (a21) a compound formed by reduction of titanium tetrachloride by means of an organometallic compound of main groups I to III of the periodic table or
 (a22) titanium tetrachloride with
 (B) a halogen-free organoaluminum compound and
 (C) a compound from the group comprising cyclopolyenes and aromatic carboxylic acid esters, wherein the mixed catalyst being used in both stages is composed of about 0.001 to 1 mole/liter of liquid of component (A) about 0.01 to 40 moles/liter of liquid of component (B) and 0.003 to 12 moles/liter of liquid of component (C).

2. The process as claimed in claim 1, wherein said mixed catalyst which has been formed by bringing into contact
 (A) the reaction product of
 (a1) a reaction product of a magnesium halide with an electron donor and/or a cyclopolyene and
 (a21) a compound formed by reduction of titanium tetrachloride by means of an organometallic compound of main groups I to III of the periodic table, with
 (B) a halogen-free organoaluminum compound and
 (C) a compound from the group comprising cyclopolyenes and aromatic carboxylic acid esters, is used.

* * * * *